United States Patent [19]

Kaaden

[11] Patent Number: 4,752,207
[45] Date of Patent: Jun. 21, 1988

[54] APPARATUS FOR THE MANUFACTURE OF PLASTIC PARTS BY INJECTION MOLDING OR REACTION INJECTION MOLDING

[76] Inventor: Hans-Heinrich Kaaden, Friedrich-Herschel-Strasse 5, 8000 Munich 80, Fed. Rep. of Germany

[21] Appl. No.: 919,877

[22] Filed: Oct. 16, 1986

Related U.S. Application Data

[63] Continuation-in-part of Ser. No. 865,197, Apr. 1, 1986.

[30] Foreign Application Priority Data

Oct. 16, 1985 [DE] Fed. Rep. of Germany ....... 3536772

[51] Int. Cl.⁴ .......................................... B29C 45/74
[52] U.S. Cl. .................. 425/548; 264/328.8; 264/328.15; 425/549; 425/566; 425/572; 425/588
[58] Field of Search ................. 425/588, 549, 567–572, 425/548, 589, 573–575, 564, 566, 577, DIG. 35, DIG. 221, 450.1, 451.9; 264/328.8, 328.14, 328.15, 328.16

[56] References Cited

U.S. PATENT DOCUMENTS

| | | | |
|---|---|---|---|
| 2,206,098 | 7/1940 | Lester | 425/568 X |
| 2,233,558 | 3/1941 | Shaw | 425/569 X |
| 2,239,338 | 4/1941 | Norelli | 425/572 |
| 2,579,809 | 12/1951 | Fellows et al. | 425/568 X |
| 2,871,517 | 2/1959 | Allard | 425/572 X |
| 2,940,123 | 6/1960 | Beck et al. | 425/568 X |
| 3,091,812 | 6/1963 | Witkowski | 425/588 X |
| 3,281,898 | 11/1966 | Compton | 425/568 X |
| 3,935,972 | 2/1976 | Tsunemoto et al. | 425/568 X |
| 4,036,405 | 7/1977 | Mombaecher | 425/568 X |
| 4,290,744 | 9/1981 | Dannels et al. | 425/572 X |

FOREIGN PATENT DOCUMENTS

| | | | |
|---|---|---|---|
| 20546 | 6/1976 | Japan | 425/572 |
| 14728 | 1/1983 | Japan | 425/588 |
| 166030 | 10/1983 | Japan | 425/588 |
| 181624 | 10/1983 | Japan | 425/588 |

*Primary Examiner*—Richard L. Chiesa
*Attorney, Agent, or Firm*—Collard, Roe & Galgano

[57] ABSTRACT

There is provided an apparatus for the manufacture of plastic parts from thermoplastic, thermoset and/or elastomer material by injection molding or reaction injection molding. The apparatus includes a multi-station locking unit of horizontal or vertical configuration adapted to hold a number of molds, and an associated injection unit of the simultaneous injection of the molds. The apparatus further has a movable center mold clamping plate sectioned lengthwise relative to the locking direction, the two parts of the plate being kept together by a high-speed clamping device and having arranged between the parts a melt conduction system having one or a number of separate melt conduction rails. Each melt conduction rail is rigidly clamped at its face between the sectioned mold clamping plate lengthwise relative to the direction of flow of the melt. The apparatus further includes a median centering collar and a widened melt inlet with rounded side walls adapted to receive the nozzle system and which are arranged on a flange of the melt conduction rail. A cut-off nozzle system capable of being displaced within itself in the direction of injection is rigidly mounted on a right angled adapter connected to the screw unit. The melt compensation system for receiving the back-flow of melt when the cut-off nozzle system is displaced is formed by the displacement volume of the screw unit.

11 Claims, 1 Drawing Sheet

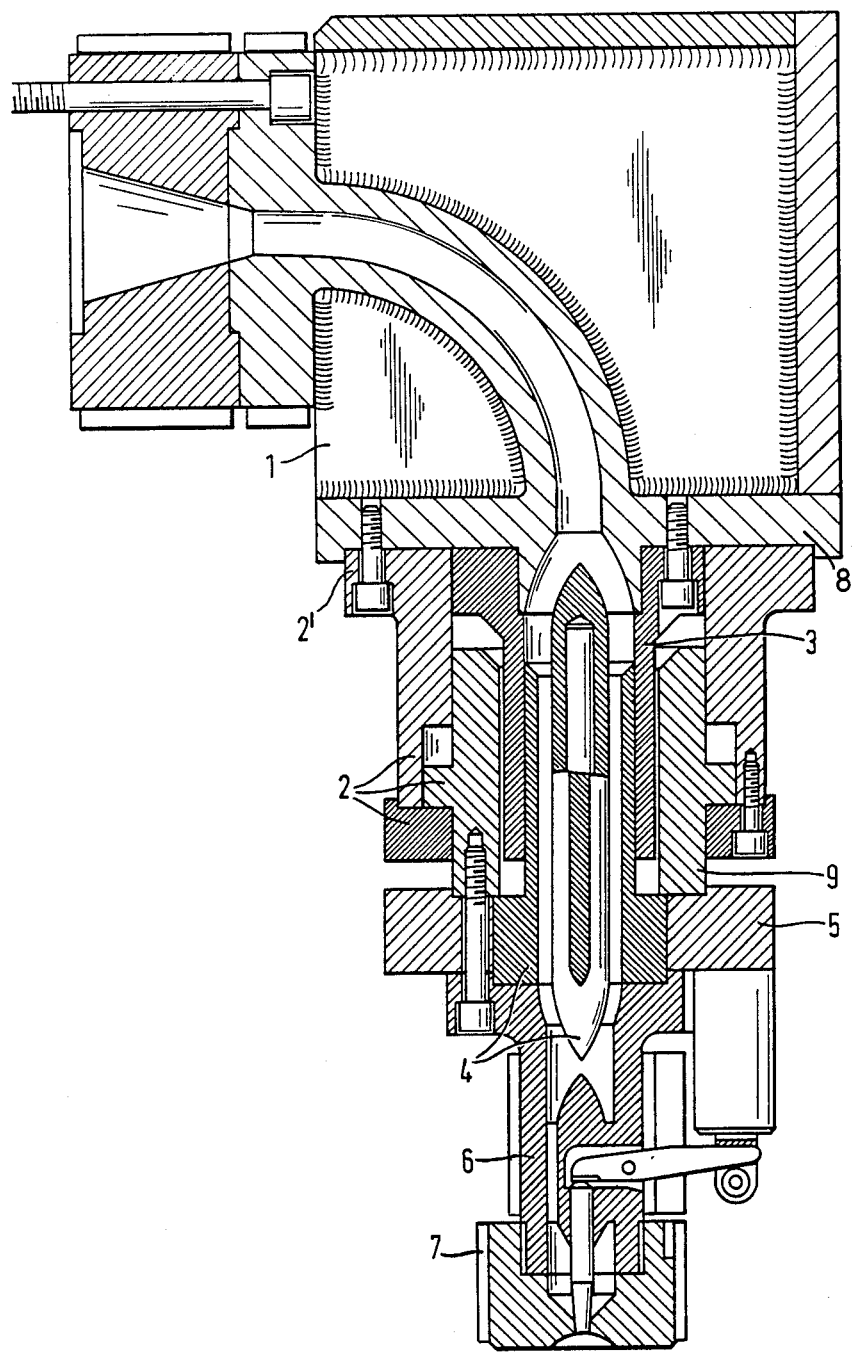

APPARATUS FOR THE MANUFACTURE OF PLASTIC PARTS BY INJECTION MOLDING OR REACTION INJECTION MOLDING

This is a continuation in part of U.S. Ser. No. 865,197, filed Apr. 1, 1986.

The present invention relates to an apparatus for the manufacture of plastic parts from thermoplastic, thermoset and/or elastomer material by injection molding or reaction injection molding. Such apparatus includes a multi-station locking unit of horizontal or vertical configuration designed to hold a number of molds and an associated injection unit for the simultaneous injection of the molds. The apparatus further includes a movable center mold clamping plate sectioned lengthwise relative to the locking direction, the two parts being kept together by a high-speed clamping device, and a melt conduction system with one or a number of separate melt conduction rails arranged between the two parts. Each melt conduction rail is rigidly clamped at its face side between the sectioned mold clamping plate lengthwise relative to the direction of flow of the melt, and a median centering collar and a widened melt inlet with rounded side walls, designed to receive the nozzle system, arranged on a flange of the melt conduction rail.

The injection molding machine described above is disclosed in my earlier filed applications U.S. Ser. Nos. 865,197 and 909,835, filed Sept. 19, 1986, the disclosures of which are herein incorporated by reference.

BRIEF DESCRIPTION OF THE INVENTION

The arrangement of one or a number of separate melt conduction rails between the parts of the center mold clamping plate, which is sectioned lengthwise relative to the locking direction, assures rapid and uniform injection of both molds utilizing any mold shape. This design of the center mold clamping plate with melt conduction rails requires consideration of an appropriate design for the cut-off nozzle system.

For separation of the movable center, sectioned mold clamping plate from the associated screw unit, which separation is required for the removal of the molded parts from the molds, I have proposed in my earlier application, U.S. Ser. No. 909,841, filed Sept, 9, 1986, to rigidly mount on the face side of the melt conduction rail a cut-off nozzle system that is displaceable within itself in the direction of injection, and to associate therewith a melt compensation system within the melt conduction rail. Such a design makes it possible to leave the injection unit with one or several screw units in a fixed injection position during the production cycle. The separation of the movable center, sectioned mold clamping plate from the associated screw unit, which is required for the removal of the molded parts from the molds, is accomplished by retracting the cut-off nozzle system, which is displaceable within itself. Since the cut-off nozzle system only needs to be retracted a minimal distance, the separation and reconnection thereof can take place in a short time span. The melt compensation system required for this design is formed of a melt chamber with associated hydraulic cylinder and piston, piston rod and guide sleeve, and thus employs a relatively large number of elements or parts.

It is, therefore, the object of the present invention to separate the movable center, sectioned mold clamping plate of an injection molding machine from its associated screw unit so as to remove the molded parts from the molds, without the arrangement of an additional melt compensation system while at the same time reducing the number of elements necessary to accomplish the object.

The above object is accomplished in accordance with the present invention by providing a right-angled adapter connected to the screw unit, a cut-off nozzle system capable of being displaced within itself in the direction of injection rigidly arranged on such adapter, and the required melt compensation system being formed by the displacement volume of the screw unit.

According to another feature of the invention, the cut-off nozzle system is formed by a hydraulic cylinder having a flange, an interior torpedo guide sleeve with an internally heated, displaceable torpedo, and a displaceable nozzle plate with a heated cut-off nozzle. The hydraulic cylinder, with its flange, and the torpedo guide sleeve may be detachably connected to a mounting flange of the adapter. The displaceable piston of the hydraulic cylinder is designed as a ring shaped piston, to which the nozzle plate may be detachably connected.

Because of the design according to the present invention, the separation of the mold clamping plate from the screw unit is readily accomplished.

Other objects and features of the present invention will become apparent from the following detailed description considered in connection with the accompanying drawing. It is to be understood, however, that the drawing is designed as an illustration only and not as a definition of the limits of the invention.

BRIEF DESCRIPTION OF THE FIGURE

The single figure of the drawing is a vertical cross-sectional view through a 90°-adapter with a cut-off nozzle system connected thereto, the latter being in the injection position and displaceable within itself.

DETAILED DESCRIPTION OF THE INVENTION

In the drawing, there is shown a cut-off nozzle system that is displaceable within itself in the direction of injection rigidly mounted on a 90°-adapter, designated 1. The required melt compensation system is formed by the displacement volume of the screw unit, which is not shown in the drawing. The cut-off nozzle system is formed by a hydraulic cylinder 2 with a flange 2', an interior torpedo guide sleeve 3 with an internally heated, displaceable torpedo 4, and a displaceable nozzle plate 5 with the heatable cut-off nozzle 6. An external heating system 7 is arranged on the cut-off nozzle 6.

The figure shows that hydraulic cylinder 2 with its flange 2' and torpedo guide sleeve 3 are detachably connected to a mounting flange 8 of adapter 1. The displaceable piston of hydraulic cylinder 2 is designed as a ring shaped piston 9, on which nozzle plate 5 is detachably connected.

This invention makes use of the fact that the screw unit used in such an injection molding apparatus consists of a cylinder and screw, which jointly form in the tip of the cylinder the displacement volume by way of the screw cylinder. On completion of the dwell time phase, the screw is hydraulically retracted, which can be compared to the action of a piston. The free displacement volume resulting from this retraction of the screw receives the back-flow of melt that occurs when the cut-off nozzle system is displaced.

While only a single embodiment of the present invention has been shown and described, it will be obvious that many changes and modifications may be made thereunto without departing from the spirit and scope of the invention.

What is claimed is:

1. An apparatus for the manufacture of plastic parts from thermoplastic, thermoset and/or elastomer material by injection molding or reaction injection molding, having a nozzle system and a screw unit, said apparatus having a multi-station locking unit of horizontal or vertical configuration adapted to hold a number of molds, an associated injection unit for the simultaneous injection of the molds, a movable center mold-clamping plate sectioned lengthwise into two parts relative to the locking direction, the two parts of said mold-clamping plate being kept together by a high-speed clamping device and having a melt conduction system disposed between the two parts, the melt conduction system having one or a number of separate melt conduction rails, each melt conduction rail being rigidly clamped at its face side between the sectioned mold-clamping plate lengthwise relative to the direction of flow of the melt, and a median centering collar and a widened melt inlet with rounded side walls adapted to receive the nozzle system arranged on a flange of the melt conduction rail, said nozzle system comprising:

a right-angled adapter connected to the screw unit of the apparatus, a cut-off nozzle system displaceable within itself in the direction of injection rigidly mounted on said adapter, and a melt compensation system, for receiving the back-flow of melt when the cut-off nozzle system is displaced, formed by the displacement volume of the screw unit.

2. The apparatus according to claim 1, wherein the cut-off nozzle system is formed by a hydraulic cylinder with a flange, an interior torpedo guide sleeve with an internally heated torpedo, and a displaceable nozzle plate with a heatable cut-off nozzle.

3. The apparatus according to claim 2, wherein said hydraulic cylinder with its flange and said torpedo guide sleeve are detachably connected to a mounting flange of the adapter.

4. The apparatus according to claim 3, wherein said displaceable piston of the hydraulic cylinder is formed as a ring shaped piston on which the nozzle plate is detachably connected.

5. The apparatus according to claim 4, wherein a rigid cut-off nozzle is arranged on the face side of the melt conduction rail.

6. The apparatus according to claim 1, wherein said cut-off nozzle system associated with the screw unit is rigidly connected therewith, and guideways are arranged on the face sides of the adapter belonging to the cut-off nozzle system.

7. The apparatus according to claim 6, wherein counterways arranged to match the guideways of the adapter are associated with such guideways in the movable center, sectioned mold clamping plate for producing a form-fitted connection.

8. An apparatus for the manufacture of plastic parts from thermoplastic, thermoset and/or elastomer material by injection molding or reaction injection molding, having a nozzle system and a screw unit, said apparatus having a multi-station locking unit of horizontal or vertical configuration adapted to hold a number of molds, an associated injection unit for the simultaneous injection of the molds, a movable center mold-clamping plate sectioned lengthwise into two parts relative to the locking direction, the two parts of said mold-clamping plate being kept together by a high-speed clamping device and having a melt conduction system disposed between the two parts, the melt conduction system having one or a number of separate melt conduction rails, each melt conduction rail being rigidly clamped at its face side between the sectioned mold-clamping plate lengthwise relative to the direction of flow of the melt, and a median centering collar and a widened melt inlet with rounded side walls adapted to receive the nozzle system arranged on a flange of the melt conduction rail, said nozzle system comprising:

a right-angled adapter connected to the screw unit of the apparatus;

a cut-off nozzle system displaceable within itself in the direction of injection rigidly mounted on said adapter;

a melt compensation system for receiving the back-flow of melt when the cut-off nozzle system is displaced, formed by the displacement volume of the screw unit, said cut-off nozzle system being formed by a hydraulic cylinder, with a flange, and interior torpedo guide sleeve with an internally heated torpedo, and a displaceable nozzle plate with a heatable cut-off nozzle; and said hydraulic cylinder with its flange and said torpedo guide sleeve are detachably connected to a mounting flange of the adapter, said displaceable piston of said hydraulic cylinder being formed as a ring-shaped piston on which the nozzle plate is detachably connected.

9. The apparatus according to claim 8, wherein a rigid cut-off nozzle is arranged on the face side of the melt conduction rail.

10. The apparatus according to claim 8, wherein said cut-off nozzle system associated with the screw unit is rigidly connected therewith, and guideways are arranged on the face sides of the adapter belonging to the cut-off nozzle system.

11. The apparatus according to claim 10, wherein counterways arranged to match the guideways of the adapter are associated with such guideways in the moveable center, sectioned mold clamping plate for producing a form-fitted connection.

* * * * *